United States Patent [19]

Fernandes et al.

[11] Patent Number: 5,564,177
[45] Date of Patent: Oct. 15, 1996

[54] METHOD OF MAKING CAPTIVE O-RING FACE SEAL

[75] Inventors: Edward M. Fernandes, Eaton; Hiralal V. Patel, Dublin, both of Ohio

[73] Assignee: Parker-Hannifin Corporation, Cleveland, Ohio

[21] Appl. No.: 461,705

[22] Filed: Jun. 5, 1995

Related U.S. Application Data

[62] Division of Ser. No. 43,364, Apr. 6, 1993, Pat. No. 5,490,680.

[51] Int. Cl.⁶ .................................................. B23P 11/02
[52] U.S. Cl. ........................ 29/451; 29/890.14; 29/237; 285/379; 277/170
[58] Field of Search .............................. 29/450, 451, 235, 29/237, 402.02, 890.10–890.144, 890.15; 277/169, 170; 285/379, 382, 349

[56] References Cited

U.S. PATENT DOCUMENTS

| | | |
|---|---|---|
| 329,931 | 11/1888 | Prindle . |
| 944,423 | 12/1909 | Feix ............................................ 29/451 |
| 1,523,817 | 1/1925 | Long . |
| 3,224,080 | 12/1965 | Bryant et al. ........................ 29/890.132 |
| 3,586,350 | 6/1971 | Ashton . |
| 3,831,951 | 8/1974 | Patel et al. ................................. 277/170 |
| 3,981,066 | 9/1976 | Calvert ........................................ 29/451 |
| 4,073,307 | 2/1978 | Royce ...................................... 29/450 X |
| 4,258,925 | 3/1981 | Guyton . |
| 4,519,636 | 5/1985 | Tomlin et al. . |
| 4,886,303 | 12/1989 | Carson et al. . |
| 5,087,504 | 2/1992 | Kanai et al. . |

FOREIGN PATENT DOCUMENTS

| | | |
|---|---|---|
| 117799 | 12/1943 | Australia . |
| 0297552 | 1/1989 | European Pat. Off. . |
| 872779 | 6/1942 | France . |

OTHER PUBLICATIONS

Drawings showing prior art valve assembly, Exhibits A1–A2.
Drawings showing prior art valve assembly, Exhibits B1–B3.

Primary Examiner—Larry I. Schwartz
Assistant Examiner—Khan V. Nguyen
Attorney, Agent, or Firm—Renner, Otto, Boisselle & Sklar

[57] ABSTRACT

A fitting body is provided with a lip that protrudes radially from at least one of the side walls of the seal groove in the sealing face toward the other side wall to form an undercut whereby an annular seal is trapped axially behind the lip to prevent the annular seal from falling out of the groove. The lip is formed by forming the fitting body with a ledge that is integral with the fitting body and protrudes axially from the sealing face adjacent one of the side walls of the groove in the sealing face. The ledge is then flattened to form the lip and an annular seal such as an elastomeric O-ring seal is then inserted into the groove with the annular seal being mechanically trapped axially behind the lip to prevent the annular seal from falling out of the groove.

18 Claims, 2 Drawing Sheets

METHOD OF MAKING CAPTIVE O-RING FACE SEAL

This is a division of application Ser. No. 08/043,364, filed Apr. 6, 1993, now U.S. Pat. No. 5,490,680.

The invention herein described relates generally to fluid sealing devices and, more particularly, to a face seal and a method of making same.

BACKGROUND

Face seals are being used to eliminate leakage that often arises from improper use or other deficiencies of fittings that rely on metal-to-metal sealing. A typical face seal fitting includes a fitting body having a center bore that opens to a transverse sealing face. The outer periphery of the fitting body often is provided with external threads while the sealing face has formed therein an annular groove for containing an annular seal such as an elastomeric O-ring seal. The annular seal usually has an axial dimension greater than the depth of the groove so as to project from the sealing face. Accordingly, the annular seal will be compressed in the groove upon being engaged by a confronting sealing surface of a mating part.

In face seal tube fittings, elastomeric O-ring seals have been retained in the sealing face grooves by an interference fit usually at the outer diameter of the O-ring seal. Although this has proven to be adequate for the smaller tube fitting sizes, the larger tube fitting sizes have for a long time been plagued by the problem of the O-ring seal falling out of the groove. This problem in part is attributable to outer diameter variations of the larger O-ring seal sizes and in part to the slenderness of the larger diameter O-ring seals made of Buna-N rubber and the like. One disadvantage arising from this falling out problem is that the O-ring seals often become separated from the fittings during handling. The same problem and associated disadvantages no doubt plague other types of fittings and devices including face seals.

To overcome this problem it has been recommended that a dovetail groove be machined so that the O-ring is trapped by the converging sidewalls of the groove. This recommendation has not been widely accepted, since it is quite expensive to machine such dovetail grooves. Further attempts to retain the O-ring in its groove prior to assembly involve the use of an adhesive or grease to secure the O-ring within the groove. Extreme care must be exercised in using adhesives, since the member and the groove must be maintained in a clean condition for the adhesive to function, and grease does not provide a secure bond between the O-ring and the groove. Furthermore, grease and adhesives tend to pick up foreign matter and such foreign matter may interfere with the seal, particularly if it is present on the face of the member. Moreover, the necessary hand operations add to the cost of manufacturing.

In U.S. Pat. No. 3,831,951 there is described a technique that provides an O-ring groove which traps the O-ring in place. The O-ring groove is manufactured by first machining an O-ring groove in the flat face of a member and around an area to be sealed. At least one of the sidewalls of the groove so formed is deformed into the groove so that it forms an acute angle with the bottom wall of the groove and so that an upper lip of the deformed sidewall is spaced from the bottom wall a distance which exceeds the sectional radius of the O-ring and which defines a circle having a diameter less than the outside diameter but greater than the inside diameter of an O-ring to be inserted in the groove. When the O-ring is inserted in the groove, it is trapped by the deformed sidewall.

Several techniques for accomplishing the deforming operation are described in the '951 patent. A problem with these techniques is that they do not lend themselves to providing a continuous planar sealing face adjacent the deformed sidewall of the groove. This is particularly disadvantageous in high pressure applications when the lip of the deformed sidewall is on the sealing side of the groove, which is typically at the outer diameter of the groove in high pressure face seal fittings.

SUMMARY OF THE INVENTION

The present invention provides a unique solution to the aforesaid problem that does not suffer from drawbacks associated with the previously proposed solutions discussed above. The invention provides a novel method of forming integrally with a body a lip that protrudes radially from at least one of the side walls of the groove in the sealing face around an area to be sealed toward the other side wall at the sealing face to form an undercut whereby an annular seal can be trapped axially behind the lip to prevent the annular seal from falling out of the groove. The method of the invention is particularly suited for use with high production equipment such as multi-spindle automatic and multi-station rotary index type machines.

In accordance with the method of the invention, the body is machined with a ledge that is integral with the body and protrudes axially from the sealing face adjacent one of the side walls of the groove in the sealing face. The ledge is then flattened as by rolling to form a lip that protrudes radially from the adjacent side wall of the groove toward the other groove side wall to form an undercut. An annular seal such as an elastomeric O-ring seal is then inserted into the groove with the annular seal being mechanically trapped axially behind the lip to prevent the annular seal from falling out of the groove.

As will be appreciated by those skilled in the art, high production machining equipment can be used to machine the groove and ledge in the sealing face of the body and then roll or flatten the ledge to form the lip without removing the body from the machining equipment wherein the body and tools are rotated relative to one another. More particularly, a workpiece holder holds the body while a cutting tool is first moved parallel to the rotation axis to machine the groove and ledge and then a ledge flattening tool is moved parallel to the rotation axis to flatten the ledge to form the lip.

Accordingly, the present invention provides a face seal comprising a body having a transverse sealing face and an annular groove in the sealing face surrounding an area to be sealed and having radially outer and inner side walls and a bottom wall, and a lip integral with the body and protruding radially from one of the side walls toward the other side wall at the sealing face to form an undercut; and an annular seal in the groove that is trapped axially behind the lip to prevent the annular seal from falling out of the groove. In accordance with the invention, the lip is stressed beyond its elastic limit and has an axially outer flat planar surface flush and continuous with the sealing face adjacent the groove.

In a preferred embodiment, the annular seal has an axial dimension greater than the depth of the groove such that the annular seal projects axially outwardly from the sealing face for engaging and being compressed in the groove by a confronting sealing surface of a mating part. The lip is generally V-shape with one side thereof flush with the sealing face as above indicated and the other side sloped at an angle to the axis of the body thereby approximately giving the groove a half dovetail shape. As is also preferred, the groove and annular seal are relatively dimensioned such that the annular seal substantially but not completely fills the groove when compressed by the confronting sealing surface of the mating part.

The foregoing and other features of the invention are hereinafter more fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION

Figure 1:
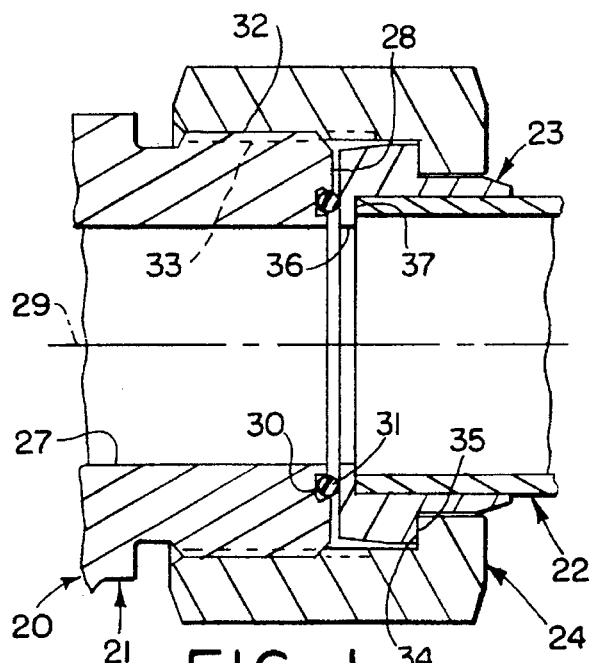
FIG. 1 is a fragmentary sectional view of a tube fitting assembly including a captive face seal according to the invention, shown after initial assembly but prior to tightening of the nut onto the fitting body.

Referring now in detail to the drawings and initially to FIG. 1, a face seal or face seal assembly according to a preferred embodiment of the invention is illustrated in the context of a tube fitting assembly indicated generally at 20. The tube fitting assembly comprises a fitting body 21, tube 22, sleeve 23 and a nut 24 which are shown partially assembled together in conventional manner.

The fitting body 21 has a center bore 27 terminating at one end at a sealing face 28 that is transverse (perpendicular) to the axis 29 of the center bore. The sealing face 28 has formed therein, concentrically with the center bore, an annular groove 30 which contains an annular seal 31 such as an elastomeric O-ring, as illustrated. The outer periphery of the fitting body has external threads 32 for engaging internal threads 33 of the nut 24.

The nut 24 is telescoped over the sleeve 23 which in turn is telescoped over the end of the tube 22. The nut has at its rearward end a stop shoulder 34 which engages a shoulder 35 on the sleeve for holding the sleeve to the fitting body 21 when the nut is screwed onto the fitting body. The sleeve 23 has a center bore 36 which is counterbored to the rear end of the sleeve for receiving the tube with the end of the tube being butted against the bottom of the counterbore 37. The sleeve may be secured to the tube in any variety of ways such as by brazing, welding, press fit, etc., or the sleeve may be a compression sleeve that is radially inwardly compressed into fluid sealing engagement with the periphery of the tube through interaction with a cam surface on the nut when the nut is tightened on the fitting body.

Figure 2:
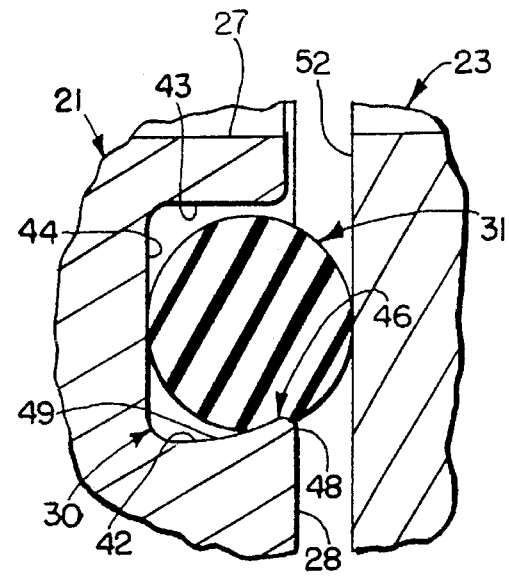
FIG. 2 is an enlarged partial sectional view corresponding to FIG. 1 and showing the face seal prior to compression into the groove in the sealing face of the fitting body.

Referring now to FIG. 2, the annular groove 30 in the sealing face 28 has a radially outer side wall 42, a radially inner side wall 43 and a bottom wall 44. In the illustrated preferred embodiment, the radially inner side wall 43 is perpendicular to the sealing face, whereas the bottom wall is transverse to the center axis of the fitting body, i.e., parallel to the sealing face 28.

In contrast to prior art face seal fittings, there is provided an annular lip 46 integral with the fitting body 21 that protrudes radially from at least one of the side walls 42 and 43 of the groove 30 in the sealing face 28 toward the other side wall at the sealing face to form an undercut whereby the annular seal 31 is trapped axially behind the lip to prevent the annular seal from falling out of the groove. In the illustrated embodiment, the lip 46 protrudes radially inwardly from the radially outer side wall 42 at the sealing face as is preferred, although the invention also encompasses the lip alternatively or additionally protruding radially outwardly from the radially inner side wall 43 of the groove. The annular lip is circumferentially continuous although it is conceivable that the function of the lip could still be achieved even if circumferentially discontinuous.

In accordance with the hereinafter described method of forming the lip 46, the lip will usually be generally V-shape having a flat planar axially outer side surface 48 that is flush and continuous with the sealing face 28 adjacent the groove and an axially inner surface 49 that is sloped to the center axis of the fitting body. This approximately gives the groove a half dovetail shape. The lip functions to capture the annular seal 31 which has an outer diameter (dimension) greater than the inner diameter (dimension) of the lip. Of course, if the lip is provided adjacent the radially inner side wall 43 of the groove, the annular seal would have an inner diameter (dimension) less than the outer diameter (dimension) of the lip.

Figure 3:
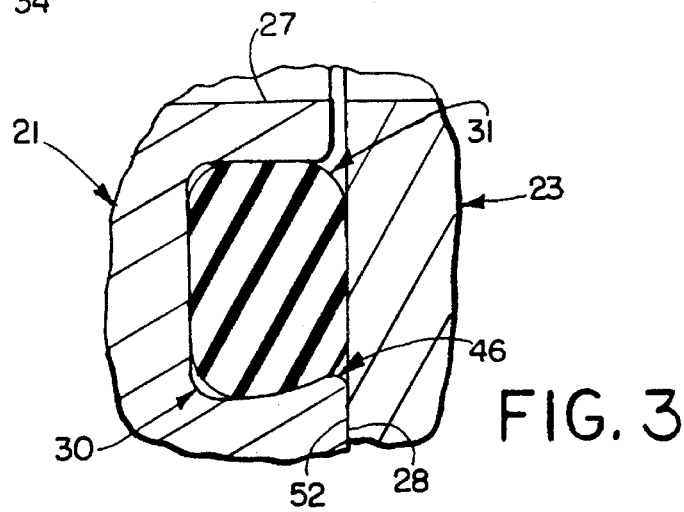
FIG. 3 is a view similar to FIG. 2, but showing the face seal fully compressed into the sealing face groove.

In the illustrated embodiment, the lip 46 has an axial dimension greater than the depth of the groove 30 such that the annular seal 31 projects axially outwardly from the sealing face 28 for engaging and being compressed in the groove by a confronting sealing surface of a mating part, which in the illustrated assembly is the end face 52 of the sleeve 23. The annular seal and groove preferably are relatively dimensioned such that a small space is provided between the annular seal side wall of the groove opposite the lip as shown in FIG. 2 to accommodate radial expansion of the seal cross-section when compressed into the groove. As further shown in FIG. 2, the annular seal preferably touches the axially inner side surface of the lip. As shown in FIG. 3, the groove and annular seal also preferably are relatively dimensioned such that the annular seal substantially but not completely fills the groove when compressed by the confronting sealing surface 52 of the mating part 23, whereby the annular seal will remain self-energized and not be "packed" into the groove. As is preferred, especially for high pressure applications where the contained pressure is greater than 1500 psi, the O-ring is intended to be a self-energized or live seal as opposed to a packing-type seal.

As in most face seal fitting assemblies, the fitting and mating part will be secured together with the sealing face and confronting sealing surface butted against one another at least over a portion thereof. In the illustrated embodiment, the sealing face radially outwardly of the groove is engaged by the end face of the sleeve whereas the fitting body face radially inwardly of the groove is axially recessed so that it will not be contacted by the end face of the sleeve thereby to assure positive metal-to-metal contact between the body sealing face 52 and the sleeve face 28 and further to avoid any gaps between such faces to prevent extrusion of the seal into any such gaps under the pressure of the fluid being sealed.

Those skilled in the art will recognize that the groove 30 with the lip 46 may be machined in the sealing face 28 of the fitting body 21 by machines equipped with a hand operated compound cross slide or a CNC controlled cross slide. Neither method is conducive to mass production. Usually high production machines such as multi-spindle automatic and multi-station rotary indexing machines are used to machine the annular groove in the sealing face of prior art face seal fittings, but such equipment in not amendable to forming an undercut transverse to the direction of tool movement, as is necessary to machine the lip.

Figure 4:
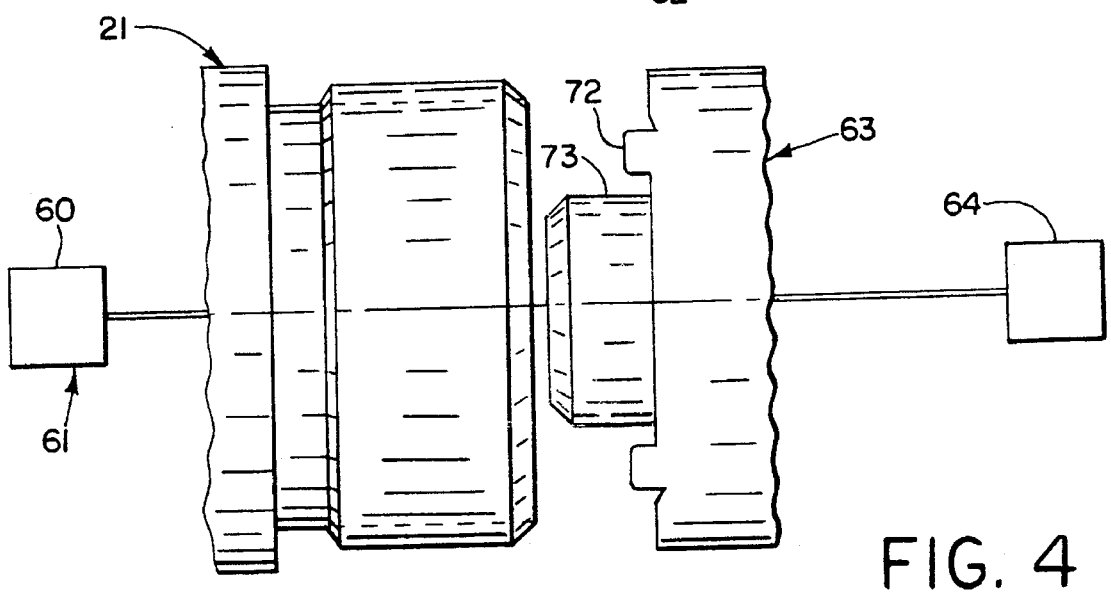
FIG. 4 is a diagrammatic view illustrating use of a tool for forming the face seal groove and ledge on the sealing face of the fitting body.
Figure 5:
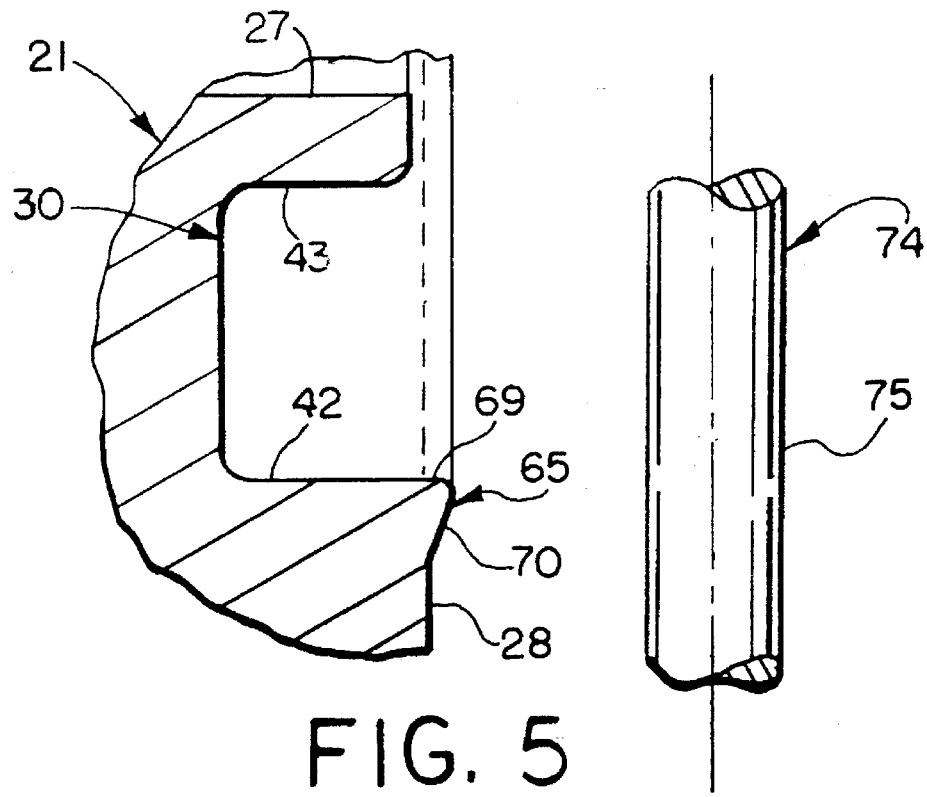
FIG. 5 is an enlarged partial sectional view showing a tool for flattening the axially protruding ledge to form the radially protruding lip.
Figure 6:
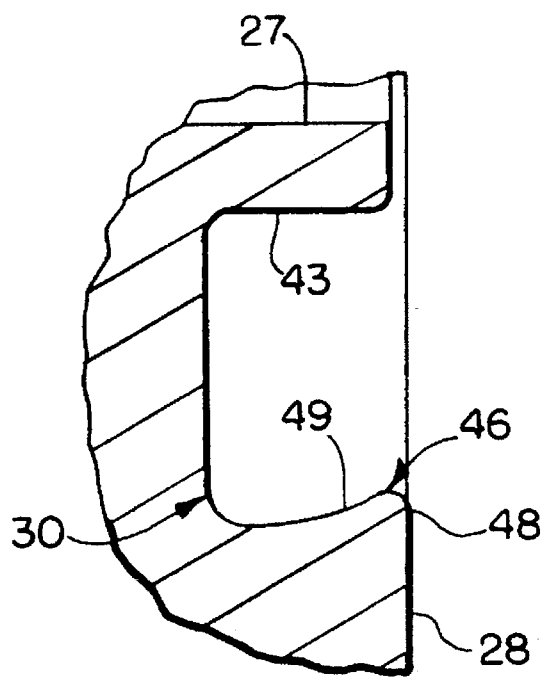
FIG. 6 is a view similar to FIG. 5 the ledge has been flattened to form the lip.

With reference to FIGS. 4–6, a method of forming the lip in accordance with the invention will now be described. As diagrammatically illustrated in FIG. 4, the fitting body 21 is held in and rotated about its central axis by a work piece holder 60, such as a rotating collet, of a multi-spindle machine 61. With the fitting body rotating, a cutting tool 63 is indexed axially by a tool holder 64 towards the rotating fitting body to machine the groove and an annular ledge 65 (FIG. 5) that protrudes axially from the sealing face adjacent the side wall of the groove on which the lip is desired, i.e., the radially outer side wall of the groove in the illustrated embodiment. As seen in FIG. 5, the ledge 65 protrudes axially from the sealing face and preferably has a V-shape with one side surface 69 flush with the adjacent groove side wall 42 and the other side surface 70 forming an acute angle with the sealing face 28 of the fitting body. As shown in FIG. 4, the cutting tool 63 may have multiple cutting edges 72 for machining the groove and ledge simultaneously in or along with the sealing face, the latter being preferred for greater accuracy. Also, the cutting tool may be provided with a locating pilot 73 that centers the tool with respect to the center bore of the fitting body.

After the groove 30 and ledge 65 have been machined, a suitable tool 74 is axially indexed towards the ledge to flatten the ledge to form the lip 46 as diagrammatically illustrated in FIG. 5. The tool 74, for example, may be a flat face, end working, roller burnishing tool provided at its working face with a plurality of radiating rollers, one of which is illustrated in FIG. 5 at 75. As the rollers 75 move perpendicular to and towards the sealing face 28 and engage the ledge on the sealing face as the fitting body is being rotated, the ledge will be flattened to form the lip. That is, the ledge is flattened out to force the side wall of the groove to flow inwards and be stressed beyond its elastic limit to form the lip. The rollers preferably are advanced to engagement with the sealing face to make the axially outer side surface 48 of the lip flush with the sealing face 28. The rollers have the axes thereof parallel to the sealing face. Other devices may be used to flatten the ledge such as a swaging tool moved axially to engagement with the ledge to deform the ledge into the lip. This eliminates the need to rotate the fitting body.

The foregoing flattening operation gives the lip an axially outer flat planar surface that is flush and continuous with the sealing face adjacent the groove. This is particularly important when the lip is located on the sealing side of the groove (the side opposite the high pressure side of the groove) as in the illustrated fitting, as is desired for high pressure applications where the pressure is greater than 1500 psi and especially where the pressure is greater than 3000 psi. This avoids the possibility of a gap between the sealing faces that the seal might otherwise be extruded into by high pressure at the other side of the groove which, in the illustrated fitting assembly, forces the annular seal radially outwardly. Preferably, the annular seal is dimensioned so that it always engages the lip side/sealing side of the groove as shown in FIGS. 2 and 3 so that the annular seal will not be stretched when pressure is applied, as repeated stretching and unstretching of the annular seal as pressure is cycled on and off will reduce the life of the annular seal.

As will be appreciated, the foregoing machining operations may be performed in a multi-spindle machine or the like without having to remove the fitting body from the workpiece holder, as is conducive to mass production of the fitting bodies. Once the machining operations are completed, the machined fitting body 21 is removed from the machining equipment, after which the annular seal 31 is inserted as by pressing into the groove 30 with the annular seal being trapped axially behind the lip 46 to prevent the annular seal from falling out of the groove.

As will be appreciated, the fitting body may be machined and formed in a multi-station rotary indexing machine wherein the fitting body is stationary and the cutting and flattening tools rotate.

Although the invention has been shown and described with respect to certain preferred embodiments, equivalent alterations and modifications will no doubt occur to others skilled in the art upon the reading and understanding of this specification. The present invention includes all such equivalent alterations and modifications, and is limited only by the scope of the following claims.

What is claimed is:

1. A method of forming a face seal on a metal body of a member having an axis along which the metal body is to be sealed to another member, comprising the steps of forming the metal body with an axially outwardly facing transverse sealing face, an annular groove in the sealing face surrounding an area to be sealed against fluid leakage, said annular groove having radially outer and inner side walls and a bottom wall, and a ledge integral with the body and protruding axially outwardly from the sealing face adjacent one of the side walls of the annular groove; then flattening the ledge to form a plastically deformed lip protruding radially from the adjacent side wall toward the other side wall at the sealing face to form an undercut; and then inserting an annular seal in the groove with the annular seal being trapped axially inwardly behind the lip to prevent the annular seal from falling out of the groove, said inserting step including resiliently deforming the annular seal for axial passage over the lip and into the undercut.

2. A method as set forth in claim 1, wherein automatic machining equipment is used to machine the groove and then flatten the ledge to form the lip without removing the body from the automatic machining equipment.

3. A method as set forth in claim 2, wherein the body and groove forming tool are relatively rotated while the groove forming tool is first moved parallel to the rotation axis to machine the groove and ledge in the sealing face of the body, and then a relatively rotating ledge flattening tool is moved parallel to the rotation axis to flatten the ledge to form the lip.

4. A method as set forth in claim 1, wherein the annular seal has an axial thickness and the groove is machined to a depth less than the axial thickness of the annular seal whereby the annular seal will project outwardly of the face for engaging a confronting surface of said another member adapted for connection with the body.

5. A method as set forth in claim 4, wherein the side walls are machined perpendicular to the sealing face.

6. A method as set forth in claim 1, wherein the ledge is formed adjacent the radially outer side wall and is flattened such that it protrudes radially inwardly from the radially outer side wall, and the annular seal is inserted into the groove with a radially outer portion thereof radially overlapped by the lip.

7. A method as set forth in claim 1, wherein the ledge is formed adjacent the radially inner side wall and is flattened such that it protrudes radially outwardly from the radially inner side wall, and the annular seal is inserted into the groove with a radially inner portion thereof radially overlapped by the lip.

8. A method as set forth in claim 1, wherein the groove and annular seal are relatively dimensioned such that the annular seal substantially fills the groove when compressed with its radially outer surface flush with the sealing face.

9. A method as set forth in claim 1, wherein the thus formed lip is circumferentially continuous.

10. A method as set forth in claim 1, wherein the groove and annular seal are relatively dimensioned such that the annular seal is radially spaced from the other side wall when trapped in the groove.

11. A method of forming a face seal on a body of a member having an axis along which the body is to be sealed to another member, comprising the steps of forming the body with an axially outwardly facing transverse sealing face, an annular groove in the sealing face surrounding an area to be sealed against fluid leakage, said annual groove having radially outer and inner side walls and a bottom wall, and a ledge integral with the body and protruding axially outwardly from the sealing face with a side surface thereof flush with one of the side walls of the annular groove; then flattening the ledge to form a lip protruding radially from the adjacent side wall toward the other side wall at the sealing face to form an undercut; and then inserting an annular seal in the groove with the annular seal being trapped axially inwardly behind the lip to prevent the annular seal from falling out of the groove, said inserting step including resiliently deforming the annual seal for axial passage over the lip and into the undercut.

12. A method as set forth in claim 11, wherein automatic machining equipment is used to machine the groove and then flatten the ledge to form the lip without removing the body from the automatic machining equipment.

13. A method as set forth in claim 12, wherein the body and groove forming tool are relatively rotated while the groove forming tool is first moved parallel to the rotation axis to machine the groove and ledge in the sealing face of the body, and then a relatively rotating ledge flattening tool is moved parallel to the rotation axis to flatten the ledge to form the lip.

14. A method as set forth in claim 13, wherein the side walls are machined perpendicular to the sealing face.

15. A method as set forth in claim 11, wherein the ledge, prior to the flattening step, is formed with another side surface forming an acute angle with the sealing face.

16. A method of forming a face seal on a body of a member having an axis along which the body is to be sealed to another member, comprising the steps of forming the body with an axially outwardly facing transverse sealing face, an annular groove in the sealing face surrounding an area to be sealed against fluid leakage, said annular groove having radially outer and inner side walls and a bottom wall, and a ledge integral with the body and protruding axially outwardly from the sealing face adjacent one of the side walls of the annular groove; then flattening the ledge to form a lip protruding radially from the adjacent side wall toward the other side wall at the sealing face to form an undercut; and then inserting an annular seal in the groove with the annular seal being trapped axially inwardly behind the lip to prevent the annular seal from falling out of the groove, said inserting step including resiliently deforming the annual seal for axial passage over the lip and into the undercut, and wherein automatic machining equipment is used to machine the groove and then flatten the ledge to form the lip without removing the fitting body from the automatic machining equipment.

17. A method as set forth in claim 16, wherein the body and groove forming tool are relatively rotated while the groove forming tool is first moved parallel to the rotation axis to machine the groove and ledge in the sealing face of the body, and then a relatively rotating ledge flattening tool is moved parallel to the rotation axis to flatten the ledge to form the lip.

18. A method as set forth in claim 16, wherein the side walls are machined perpendicular to the sealing face.

\* \* \* \* \*